US008346774B1

(12) United States Patent
Kanevsky et al.

(10) Patent No.: US 8,346,774 B1
(45) Date of Patent: Jan. 1, 2013

(54) PROTECTING NETWORK ENTITY DATA WHILE PRESERVING NETWORK PROPERTIES

(75) Inventors: Dimitri Kanevsky, Ossining, NY (US); James R. Kozloski, New Fairfiled, CT (US); Clifford A. Pickover, Yorktown Heights, NY (US); Tara N. Sainath, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/204,831

(22) Filed: Aug. 8, 2011

(51) Int. Cl.
*G06F 17/30* (2006.01)

(52) U.S. Cl. ........ 707/737; 707/601; 707/600; 707/711; 707/759; 707/769; 709/205

(58) Field of Classification Search .......... 707/600–601, 707/711, 737, 759, 769; 709/205
See application file for complete search history.

(56) References Cited

U.S. PATENT DOCUMENTS

| | | | |
|---|---|---|---|
| 6,253,198 B1 * | 6/2001 | Perkins | 707/711 |
| 6,687,739 B2 * | 2/2004 | Anupam et al. | 709/204 |
| 6,892,298 B2 | 5/2005 | West | 713/2 |
| 6,973,656 B1 * | 12/2005 | Huynh et al. | 719/315 |
| 7,571,463 B1 | 8/2009 | Fedyk et al. | 726/3 |
| 7,657,493 B2 * | 2/2010 | Meijer et al. | 706/12 |
| 7,930,197 B2 * | 4/2011 | Ozzie et al. | 705/7.11 |
| 8,234,688 B2 * | 7/2012 | Grandison et al. | 726/1 |
| 2002/0073155 A1 * | 6/2002 | Anupam et al. | 709/205 |
| 2005/0091226 A1 * | 4/2005 | Lin et al. | 707/100 |
| 2007/0162434 A1 * | 7/2007 | Alessi et al. | 707/4 |
| 2008/0082393 A1 * | 4/2008 | Ozzie et al. | 705/10 |
| 2008/0082467 A1 * | 4/2008 | Meijer et al. | 706/12 |
| 2009/0126023 A1 | 5/2009 | Yun et al. | 726/3 |
| 2009/0303237 A1 * | 12/2009 | Liu et al. | 345/440 |
| 2009/0307592 A1 * | 12/2009 | Kalanithi et al. | 715/716 |
| 2011/0029566 A1 * | 2/2011 | Grandison et al. | 707/783 |
| 2011/0047597 A1 * | 2/2011 | Mahaffey et al. | 726/3 |
| 2011/0055264 A1 * | 3/2011 | Sundelin et al. | 707/776 |
| 2011/0077977 A1 * | 3/2011 | Collins et al. | 705/4 |
| 2011/0078143 A1 * | 3/2011 | Aggarwal | 707/737 |
| 2011/0099142 A1 * | 4/2011 | Karjalainen et al. | 707/600 |
| 2011/0107434 A1 * | 5/2011 | Chow et al. | 726/28 |
| 2011/0178943 A1 * | 7/2011 | Motahari et al. | 705/325 |

(Continued)

OTHER PUBLICATIONS

"The Challenges of Effectively Anonymizing Network Data", Scott E. Coull et al., 7 pgs.

(Continued)

*Primary Examiner* — Frantz Coby
(74) *Attorney, Agent, or Firm* — Harrington & Smith; Louis J. Percello (57) ABSTRACT

In one exemplary embodiment, a storage medium embodying a program of instructions for performing operations including: storing raw information for primary properties of primary nodes within a primary network; in response to receiving a query, transforming the raw information into transformed information using key(s) and based on the query, the query is in relation to a queried property, the transformed information is transformed data for the queried property, the transformed information represents a surrogate network having surrogate nodes corresponding to a portion of the primary nodes, the transformed information enables performance of operation(s) without specific knowledge of and without revealing the entirety, the transformed information further enables one having the key(s) to relate an output of the operation to the raw information; and generating a solution that relates a transformed query to the transformed information, the transformed query is a transformed representation of the query obtained by using the key(s).

25 Claims, 4 Drawing Sheets

U.S. PATENT DOCUMENTS

2011/0295722 A1* 12/2011 Reisman ............... 705/27.1
2012/0151541 A1* 6/2012 Vonog et al. ............ 725/109

OTHER PUBLICATIONS

"Design and Analysis of Stream Cipher for Network Security", C.S. Lamba, IEEE 2010, pp. 562-567.
"On Protecting Private Information in Social Networks: A Proposal", Bo Luo, et al., Dept. of EECS, The Univ. of Kansas, 4 pgs.
"Differentially-Private Network Trace Analysis", Frank McSherry et al., SIGCOMM 2010, 12 pgs.
"Privacy-preserving Robust Data Aggregation in Wireless Sensor Networks", Mauro Conti, et al., 21 pgs.
"Sparse Representations for Text Categorization", Tara N. Sainath et al., 4 pgs.
"Social Network Analysis as an Analytic Tool for Interaction Patterns in Primary Care Practices", John Scott et al., Annals of Family Medicine, vol. 3, No. 5, 2005, 6 pgs.
"Happiness is contagious in social networks", Elizabeth Landau, CNN, Dec. 5, 2008, 2 pgs.
"Bayesian Compressive Sensing for Phonetic Classification", Tara N. Sainath et al., IEEE 2010, pp. 4370-4373.
"Are Your Friends Making You Fat?", Clive Thompson, The New York Times, Sep. 13, 2009, 11 pgs.
"Dynamic Real-Time Reports Based on Social Networks", U.S. Appl. No. 12/793,286, filed Jun. 3, 2010, 35 pgs.

* cited by examiner

FIG. 1

| Index | 1 | 2 | 3 | 4 | 5 | 6 | 7 | 8 | n |
|---|---|---|---|---|---|---|---|---|---|
| Name | Xeni | Howard | JT | Terry | Randall | Doug | Annalee | Corey | ... |
| Location | CA | CT | CT | UK | MA | UK | WY | CA | ... |
| Age | 38 | 17 | 15 | 63 | 26 | 42 | 43 | 40 | ... |
| Birthday | 8/05 | 1/27 | 5/25 | 4/28 | 10/17 | 3/11 | 1/02 | 7/17 | ... |
| Friends with (by Index) | 3, 4, 6, 8 | Ø | 2, 5, 8 | 7, 8 | 4, 8 | 1, 8 | 4, 5, 6, 8 | 2 | ... |
| Likes Llamas | No | Yes | Yes | No | Yes | Yes | No | Yes | ... |
| Has Blog | Yes | No | No | No | Yes | No | Yes | Yes | ... |
| Wears Goggles & A Cape | No | Yes | No | No | No | No | No | Yes | ... |
| Likes Hot Air Balloons | Yes | No | No | No | Yes | No | No | Yes | ... |
| Likes Raptors | Yes | No | No | Yes | No | No | Yes | No | ... |
| Firefly Fan | Yes | No | No | No | Yes | No | Yes | Yes | ... |
| Hobby: Geo-Location | No | Yes | No | Yes | Yes | Yes | No | Yes | ... |
| Likes Ice Cream | Yes | Yes | No | Yes | Yes | Yes | Yes | Yes | ... |
| Sci-Fi Fan | Yes | No | No | Yes | Yes | Yes | Yes | Yes | ... |
| Believes in Puffins | No | No | No | No | No | No | No | No | ... |

| Index | 1 | 2 | 3 | 4 | 5 | 6 | 7 | 8 | $n$ |
|---|---|---|---|---|---|---|---|---|---|
| Age | Ø | 15-19 | 15-19 | Ø | 25-29 | 40-44 | Ø | 40-44 | ... |
| Friends with (by Index) | Ø | Ø | 2, 5, 8 | Ø | 8 | 8 | Ø | 2 | ... |
| Likes Llamas | No | Yes | Yes | No | Yes | Yes | No | Yes | ... |
| Likes Ice Cream | Ø | Yes | No | Ø | Yes | Yes | Ø | Yes | ... |

PROTECTING NETWORK ENTITY DATA WHILE PRESERVING NETWORK PROPERTIES

TECHNICAL FIELD

The exemplary embodiments of this invention relate generally to networks and social networks and, more specifically, relate to protecting data privacy while enabling operations on and analysis of data for networks and social networks.

BACKGROUND

This section endeavors to supply a context or background for the various exemplary embodiments of the invention as recited in the claims. The content herein may comprise subject matter that could be utilized, but not necessarily matter that has been previously utilized, described or considered. Unless indicated otherwise, the content described herein is not considered prior art, and should not be considered as admitted prior art by inclusion in this section.

The study and analysis of online social networks has become more prominent with the increased availability and decreased cost of online access and communication. Generally, a social network may be considered a social structure comprised of individuals, groups of individuals and/or organizations (collectively referred to herein as "entities") represented as "nodes" that are connected to one another by one or more types of relationships or interdependencies (e.g., friends, kin, knowledge, employment, hobbies, interests). Online social networks and structures, such as Facebook®, have become valuable tools not only for personal communication purposes but also for informational, entertainment and advertising functions, for example.

With increased usage of online social networks, participants are also more vulnerable to appropriation of personal data and private information. It is difficult to provide access to data from social networks (e.g., family information, medical histories, networks of devices associated with the users, networks of sensors used to collect data, such as video cameras) while maintaining the privacy and anonymity of individuals associated with nodes in the networks. As an example, it is possible to analyze social networks, such as Facebook®, in order to obtain data concerning the users and participants, such as health risks based on analyses of the individual's "friends" within the social network, for example. Moreover, it is recognized that social network data and related analyses can provide a wealth of latent information concerning an individual's tastes, health and likely behavior. Because of the predictive power and informative nature, data from social networks is at once both valuable and extremely sensitive. Therefore, privacy should be maintained whenever this data is collected, analyzed or otherwise utilized.

BRIEF SUMMARY

In one exemplary embodiment of the invention, a computer readable storage medium tangibly embodying a program of instructions executable by a machine for performing operations comprising: storing raw information for at least one primary property of at least one primary node within a primary network, where the primary network is comprised of an interconnected plurality of primary nodes, where connections among the plurality of primary nodes within the primary network are based on at least one of the at least one primary property and one or more types of relationships and interdependencies between the primary nodes; in response to receiving a query on the stored raw information, transforming the stored raw information into transformed information using at least one key and based on the received query, where the received query is in relation to at least one queried property of the at least one primary property, where the transformed information comprises transformed data for the at least one queried property of the at least one primary node, where the transformed information is representative of a surrogate network comprising a plurality of surrogate nodes that correspond to at least a portion of the plurality of primary nodes from the primary network, where the transformed information does not correspond to an entirety of the stored raw information, where the transformed information is configured to enable performance of at least one operation on the transformed information without specific knowledge of and without revealing the entirety of the stored raw information, where the transformed information is further configured to enable one in possession of the at least one key to relate an output of the at least one operation to the stored raw information; and generating a solution that relates a transformed query to the transformed information, where the transformed query comprises a transformed representation of the received query obtained by using the at least one key.

In another exemplary embodiments of the invention, a method comprising: storing, on at least one memory, raw information for at least one primary property of at least one primary node within a primary network, where the primary network is comprised of an interconnected plurality of primary nodes, where connections among the plurality of primary nodes within the primary network are based on at least one of the at least one primary property and one or more types of relationships and interdependencies between the primary nodes; in response to receiving a query on the stored raw information, transforming, by a first apparatus, the stored raw information into transformed information using at least one key and based on the received query, where the received query is in relation to at least one queried property of the at least one primary property, where the transformed information comprises transformed data for the at least one queried property of the at least one primary node, where the transformed information is representative of a surrogate network comprising a plurality of surrogate nodes that correspond to at least a portion of the plurality of primary nodes from the primary network, where the transformed information does not correspond to an entirety of the stored raw information, where the transformed information is configured to enable performance of at least one operation on the transformed information without specific knowledge of and without revealing the entirety of the stored raw information, where the transformed information is further configured to enable one in possession of the at least one key to relate an output of the at least one operation to the stored raw information; and generating, by a second apparatus, a solution that relates a transformed query to the transformed information, where the transformed query comprises a transformed representation of the received query obtained by using the at least one key.

In a further exemplary embodiment of the invention, an apparatus comprising: at least one memory configured to store raw information for at least one primary property of at least one primary node within a primary network, where the primary network is comprised of an interconnected plurality of primary nodes, where connections among the plurality of primary nodes within the primary network are based on at least one of the at least one primary property and one or more types of relationships and interdependencies between the primary nodes; and at least one processor configured, in response to receiving a query on the stored raw information, to transform the stored raw information into transformed information using at least one key and based on the received query, where the received query is in relation to at least one queried property of the at least one primary property, where the transformed information comprises transformed data for the at least one queried property of the at least one primary node, where the transformed information is representative of a surrogate network comprising a plurality of surrogate nodes that correspond to at least a portion of the plurality of primary nodes from the primary network, where the transformed information does not correspond to an entirety of the stored raw information, where the transformed information is configured to enable performance of at least one operation on the transformed information without specific knowledge of and without revealing the entirety of the stored raw information, where the transformed information is further configured to enable one in possession of the at least one key to relate an output of the at least one operation to the stored raw information, where the at least one processor is further configured to generate a solution that relates a transformed query to the transformed information, where the transformed query comprises a transformed representation of the received query obtained by using the at least one key.

In another exemplary embodiment of the invention, an apparatus comprising: means for storing raw information for at least one primary property of at least one primary node within a primary network, where the primary network is comprised of an interconnected plurality of primary nodes, where connections among the plurality of primary nodes within the primary network are based on at least one of the at least one primary property and one or more types of relationships and interdependencies between the primary nodes; means, responsive to receiving a query on the stored raw information, for transforming the stored raw information into transformed information using at least one key and based on the received query, where the received query is in relation to at least one queried property of the at least one primary property, where the transformed information comprises transformed data for the at least one queried property of the at least one primary node, where the transformed information is representative of a surrogate network comprising a plurality of surrogate nodes that correspond to at least a portion of the plurality of primary nodes from the primary network, where the transformed information does not correspond to an entirety of the stored raw information, where the transformed information is configured to enable performance of at least one operation on the transformed information without specific knowledge of and without revealing the entirety of the stored raw information, where the transformed information is further configured to enable one in possession of the at least one key to relate an output of the at least one operation to the stored raw information; and means for generating a solution that relates a transformed query to the transformed information, where the transformed query comprises a transformed representation of the received query obtained by using the at least one key.

BRIEF DESCRIPTION OF THE SEVERAL VIEWS OF THE DRAWINGS

The foregoing and other aspects of embodiments of this invention are made more evident in the following Detailed Description, when read in conjunction with the attached Drawing Figures, wherein.

DETAILED DESCRIPTION

Large-scale deployments of services, applications, and systems—and the associated template storage (e.g., storage of personal data)—have heightened the need to protect personal user data stored in or for a system (e.g., a social network, an online social network). Theft or misappropriation of this data can compromise a user's privacy. Furthermore, the stolen user data can be used to compromise other user data systems that have the same trait enrolled for the user. For password authentication, the loss of a password can be managed by revoking it and replacing it with a new one. Such a safety mechanism cannot be directly employed in the case of a human network data identification system, due to the small number of human personal traits.

One way to impart a revocability property to human traits is to avoid explicit storage of human-trait templates in the system, eliminating any possibility of leakage of the original human trait. A number of template protection techniques can be designed for this purpose. These techniques can be categorized as: i) feature transformation-based techniques, and ii) cryptosystems. In feature transformation, the template is transformed using a user-specific key and only the transformed template is stored in the system. During authentication, the input traits are similarly transformed and the transformed traits are matched with the stored template. In a cryptosystem approach, an external key is associated with the template such that neither the template nor the associated key can be obtained from the stored template. As an example, the key can (only) be recovered when genuine biometrics are presented to the system. However, working with genuine biometrics can be undesirable since it may compromise user privacy on a larger scale.

Security of a feature-transformation technique can be evaluated based on two main criteria: (i) non-invertibility, and (ii) diversity. Non-invertibility refers to the difficulty in recovering the original human trait given the secure template. Diversity refers to the difficulty in guessing one secure template given another secure template generated from the same human trait. Both of these criteria may or may not assume knowledge of the password by the adversary. These two measures, however, have certain limitations. The false acceptance rate (FAR) in evaluating diversity is usually zero at a reasonable system threshold due to the limited database used in evaluations. On the other hand, the measure for non-invertibility does not take the distribution of human trait features into account, which can lead to a significant over-estimation of security.

Other solutions to this security problem include averaging data from human networks in order to amalgamate individual data into average metrics that are then used for further analysis or simulation. In such a manner, the raw individual data is not disclosed. This approach fails to solve the problem in two important ways. First, it does not allow for the network and its constituent nodes to be understood as individual and unique elements of a system, and, therefore, it degrades important information and predictive power in the data (i.e., by limiting the data made available to only the averaged data). Second, it does not allow for users of the data to communicate with individual nodes in the network based on arbitrary analyses of the data after anonymization.

Another technique for achieving privacy is for users to use aliases that are not their actual names. Although a user may use an alias, and thus break the association between his or her identity and the node that represents them in the social network, the relationships (e.g., links, topological motifs, etc.) between that node and other nodes (even if the other nodes are similarly aliased) may be sufficient to identify the identity of the user.

Any attempt to maintain privacy in a system designed to collect, analyze, and provide communication links based on data collected from human networks should meet certain requirements:
(1) The privacy system should preserve the anonymity of individuals associated with nodes in the network. This means that not only should an individual's identity not be explicitly associated with node data, but relationships between the node and other network data (such as topological relationships, network statistics, etc.) should also not allow a person skilled in the art of network data analysis to determine the association between an individual's identity and the network node or network data.
(2) The privacy system should not destroy the functional properties of the network as described by the data. This requirement states that a user of the privacy system and the network data should be able to use the data to perform analyses that are informative about the function of the specific network and specific nodes in the network. An example of a transformation of the data that does not meet this requirement is illustrative: averaging of data from nodes of a particular category in the network could necessarily render the averaged data useless in its ability to inform users of the data about the function of the network and its nodes.
(3) The privacy system should allow a user of the network data to interact with the real-world network and its nodes based on analyses of the data, and to receive feedback from the real-world network that is interpretable relative to the interaction. For example, a user of the network data should be able to send a message to specific nodes in the network identified by analysis, and to receive a reply, with the system never revealing the identity of these nodes in the real-world network and their relationships to individuals' identities.

It is useful at this point to point out that requirements (2) and (3) above are directly related to the above-referenced mathematical property known as non-invertibility. This means that it is easy to map some information onto another representation, but very difficult to find an inverse map that allows a user of the mapped data to recover the original information.

Disclosed herein are exemplary systems, methods and techniques used to analyze and transform data gathered from social networks (and related networks) in a secure and private manner. The exemplary techniques facilitate viewing, analysis, and network simulation based on network data, while preserving the privacy of individuals in the network. In one exemplary embodiment, the transformation of the data is reversible using a hidden key, allowing users of the transformed data to access and interact with members of the real-world network anonymously (e.g., based on the results of analysis and simulation).

In at least some exemplary embodiments of this invention:
(1) Privacy is introduced into a social network, but still allows for robust and useful analysis of the network data.
(2) Sparse representation is introduced for matching user network data to other network data to derive user characteristics on request. This allows the system to operate with the minimum possible amount of data.
(3) Methods for scaling and addition of new structural network data, without recomputing basic security components, are introduced.

In at least some exemplary embodiments of this invention, these techniques afford a number of advantages over standard approaches to anonymizing network data, including:
(1) Only a minimal number of nodes or data per node (e.g., using sparse representations) are used to provide user-required information and, therefore, risk of exposure of information from other nodes that were removed from consideration is reduced.
(2) It allows robust and actionable analyses of social network information without sacrificing user privacy.

The exemplary systems and methods disclosed herein are used to analyze and transform data gathered from social networks (and related networks) in a secure and private manner. For example, a researcher can analyze data associated with a person, who is represented as a node in the network, without sacrificing user privacy. The exemplary techniques facilitate viewing, analysis and network simulation based on network data, while preserving the privacy of individuals in the network. In some exemplary embodiments, the transformation of the data is reversible using a hidden key, allowing users of the transformed data to access and interact with members of the real-world network anonymously, based on the results of analysis and simulation.

Note that exemplary embodiments of this invention may be used to provide or assist with techniques for generating and/or utilizing dynamic real-time reports based on social networks in a private manner. The generation of such reports is described in commonly-assigned U.S. patent application Ser. No. 12/793,286, filed on Jun. 3, 2010, which is incorporated by reference herein in its entirety.

In one exemplary embodiment of the invention, an exemplary system (e.g., for analyzing social networks, ensuring privacy) includes a memory storing a social network data structure and a privacy engine. The social network data structure includes a plurality of attributes (e.g., information associated with people/nodes in the structure), a plurality of nodes, each of the nodes corresponding to an entity and having at least one of the attributes associated with the entity, and at least one connection connecting at least two of the nodes. The system also includes at least one processor, coupled to the memory. The at least one processor is operative to execute the privacy engine.

Various exemplary embodiments of the invention utilize sparse representations (SRs) to enable meaningful analysis of data. In some exemplary embodiments, the analysis is selectively performed on one or more portions of the data while hiding (e.g., masking, anonymizing) other, non-selected portions of the data (e.g., by using a surrogate network that preserves only some features of the data). In such a manner, user anonymity can be preserved (e.g., for data provided to an untrusted third party) while still enabling analysis of the data and the provision of useful results and information.

Below is provided a general description of SRs and related techniques. Subsequently, SRs will be considered with specific application to the exemplary embodiments of the invention (e.g., with respect to the creation and usage of a surrogate network; with respect to an untrusted third party).

Consider a volume of data for n items with the data for each item represented as a m-dimensional vector $h_i \in \mathbb{R}^m$. Let H be a m×n matrix (e.g., a dictionary) consisting of columns for the individual data vectors $h_i$ of the items (e.g., $h_i$ is a feature vector for a specific training document) such that $H=[h_1, h_2, \ldots, h_n] \in \mathbb{R}^{m \times n}$. The matrix H is an over-complete dictionary such that the number of items n (e.g., examples) is much greater than the number of entries in each vector $h_i$ (i.e., the dimension of $h_i$, which is m): m<<n. Given a new or target vector $y \in \mathbb{R}^m$, SRs enable one to solve the following equation for β:

$$y = H\beta$$

where β is a sparse vector or sparse representation. A sparseness condition is enforced on β such that it selects a small number of entries (e.g., examples) from H to describe y. In such a manner, one can use a target vector y to determine similar entries in H via the sparse vector β.

Generally, the sparse representation may be considered a set of parameters that adequately describe a particular subset from among a group of items based on one or more criteria. The group of items may comprise a set of events, models, characteristics, structures, individuals (e.g., people, persons) and/or groups of individuals (e.g., groups of people/persons), as non-limiting examples. The criteria may comprise one or more: characteristics, structures, descriptive and/or properties, as non-limiting examples. As a further non-limiting example, the criteria may comprise one or more properties or other indications regarding similarity, significance and/or correlation. The data in question may be represented using one or more of vectors, matrices, trees and/or other complex structures, as non-limiting examples. The designation of "sparse" stems from the set of parameters having a relatively small number of essential or significant entries (e.g., as compared to the overall number of entries). An essential or significant entry is broadly interpreted as an entry that has one or more large values in one or more bases and/or metrics. The non-essential or insignificant entries of the sparse representation are so small that they can be safely ignored. As described in the above example, the sparse representation describes which columns $h_i$ of the matrix H are essential (e.g., which ones match the target vector y). Small entries in the sparse representation β correspond to columns $h_i$ of the matrix H that can be ignored (e.g., since they do not correspond to the target vector y).

To extend the above approach to social networks, let i=1, 2, ..., n be indices for the n users, each of whom has a set of characteristics (e.g., age, height, weight, location, hobbies, etc.), or a subset thereof, that is stored in a m-dimensional vector $h_i \in \mathbb{R}^m$. Let H be a m×n matrix consisting of columns for the individual data vectors $h_i$ such that $H=[h_1, h_2, \ldots, h_n] \in \mathbb{R}^{m \times n}$, where m<<n (as described above). Assume that there is a new user or a query composed by a requestor, said new user/query represented by a feature vector $y \in \mathbb{R}^m$. The holder of the user data (e.g., a central network entity that is trusted) would like to know which users represented in H have the best match to the feature vector y. To determine this, one tries to find the sparsest solution to the following optimization problem:

$$\min_\beta |y - H\beta|_2 \text{ such that } |\beta|_1 < \epsilon,$$

where $|\beta|_1$ indicates that this is a L1 norm that is used to bound β.

For sufficiently small ε, there should be a sparse solution β that has only a few non-zero entries that point to users/entries in H for which the new user or query y is similar. If the matrix H has Restricted Isometry Properties (i.e., "near orthonormal," RIP) then the solution is unique with high probability and y can be accurately represented by elements in H.

Reference is made to: T. N. Sainath, A. Carmi, D. Kanevsky and B. Ramabhadran, "Bayesian Compressive Sensing for Phonetic Classification," in Proc. ICASSP, Dallas, Tex., March 2010 for a description of how SRs can be used for classification and analysis of the relationship between a feature vector y and the users in the matrix H.

In the above description, note that since the user's data vectors $h_i$ can be, and often are, a subset of all the available data (e.g., a subset of all data for all users) and further since the target feature vector y is specified by the requestor, the matrix H will be particular to the query y. Accordingly, the matrix H also may include a subset of all the available data.

As noted above, there are various security concerns for the user data. For example, if all or a portion of the user data is transmitted between two parties (e.g., the user and the trusted network entity, between two users), an intermediate agent may obtain the data if the data transmission is not properly secure. As another example, if one or more analyses are to be performed on the data (e.g., to determine age properties within the network, to locate hubs based on one or more properties, to determine in and out degree, for marketing purposes), it may be desirable to prevent the agent performing these analyses (e.g., an untrusted third party) from being able to discover the identity of the individual users.

In view of these security concerns, one can mask H in order to prevent an intruder or untrusted party from obtaining private information about users without losing linear repartition properties between user characteristics. Below is described one exemplary technique for masking the user data.

One can multiply y and H by a matrix $A \in \mathbb{R}^{m \times m}$ to obtain z=Ay and W=AH. Then the problem:

$$\min_\beta |z - W\beta|_2$$

can use the same optimization methods as were discussed above while masking the user data of y and H. In such a manner, analysis of y is still possible but the properties of y remain masked (i.e., to someone without the matrix A).

As an example, A can be constructed by a trusted party who holds it as a private key. The trusted party may construct A subject to constraints imposed by the requestor of the data. These constraints may be chosen by the requestor in order to allow for meaningful analysis of the data and, subsequently, meaningful constructions of queries using z. The trusted party may then verify that the transformation by A maintains some criterion level of anonymity of nodes in the network (represented now in W). Because only the trusted party has access to A, the data remains anonymous to all others (e.g., the requestor), but node identifiers (e.g., user identification) can be recovered by the trusted party in order to facilitate communication between the requestor of the data and the actual nodes in the network (e.g., users) represented by the query vector z.

While described above in relation to sparse representations, the exemplary embodiments of the invention are not limited to these and may be utilized in conjunction with non-sparse representations. As a non-limiting example, non-sparse representations can be created when the matrix H has full rank (i.e., an equal number of columns and rows, for example, an n×n matrix). In this case, the equation y=Hβ has a unique solution that is not sparse. All of the operations described above with respect to sparse representations (e.g., security concerns, the matrix/key A) are equally applicable to non-sparse representations.

In at least some exemplary embodiments of the invention, a difference over standard encryption approaches lies in the ability to map user data to a transformed network (e.g., a surrogate network) based on constraints imposed by a requestor of the data while maintaining invertibility of the data (e.g., for the holder of the secret key). Specifically, the way in which these constraints are imposed allows linear relations between entities to be preserved such that meaningful analysis of the nodes is permitted.

One exemplary embodiment of the invention is a system used to anonymously market to select individuals in a social network.

Consider data collected from a social networking website. This data may include information about individuals' likes and dislikes, as well as information about individuals' relationships to others on the site. This data may be used to create a network of relationships between nodes, where each node is associated with an individual user of the network. The network data then includes node data (e.g., preferences of individuals) and relationship data (e.g., connections between the nodes, individual friend relationships). This data is extracted and transformed using the exemplary method into a "surrogate network". The surrogate network has the same number of nodes as the original network, but these surrogate nodes are transformed both in terms of the node data and relationship data associated with them.

A marketing professional or other authorized researcher is provided with access to the transformed data, but does not have the hidden key used to perform the transformation. The professional can perform multiple analyses on the surrogate network, for example, to find different markets within the network that their agency may serve. Although these markets are extracted from the surrogate network (and therefore may be termed "surrogate markets"), they have value to the professional because the surrogate network is directly relatable back to the real-world network using the exemplary method.

Specifically, the marketing professional can design several marketing strategies to be applied to the surrogate network, including surveys, direct e-mail marketing, and directed advertising, as non-limiting examples. The professional deploys these, and the exemplary system then transforms these strategies, using the hidden key, into similar strategies to be applied to the real-world social network. The marketing strategies are then deployed to the real-world network based on this transformation and the impact of these strategies is measured in the real-world network using, for example, aggregate data from surveys, e-mail replies and click-through advertising data. Impact measurements are then transformed by the exemplary system, using the hidden key, in order to provide feedback and replies to the marketing professional through the surrogate network. This feedback then may be used to iterate and further evolve the marketing strategies, for example.

In such a manner, marketing can be performed to specific nodes in a network (e.g., a social network) based on analyses of one or more surrogate networks that preserve information about network properties, dynamics and responsiveness (and responsivity) to inputs (e.g., as would be desirable to a marketing professional) while at the same time maintaining the privacy of the individuals associated with the network nodes (e.g., maintaining privacy of the data associated with the nodes, such as personal data). Given an understanding of such a system, individuals could be encouraged to share more personal data, confident that it would remain private and be used only in the context of the surrogate (anonymized) network, thus providing more relevant marketing to the individual, while maintaining his or her privacy.

One or more exemplary embodiments of the invention or elements thereof can be implemented in the form of a computer program product, for example, embodied on a computer readable storage medium with computer program code for performing the steps indicated (e.g., the exemplary methods). Furthermore, one or more exemplary embodiments of the invention or elements thereof can be implemented in the form of an apparatus including at least one memory and at least one processor (e.g., that is coupled to the memory) and operative to perform the exemplary method steps. Yet further, in another aspect, one or more exemplary embodiments of the invention or elements thereof can be implemented in the form of means for carrying out one or more of the method steps described herein; the means may include (i) one or more hardware modules, (ii) one or more software modules executing on one or more hardware processors, or (iii) a combination of hardware and software modules. Any of (i)-(iii), separately or in combination, may be utilized to implement the various exemplary embodiments set forth herein. In some exemplary embodiments, the one or more software modules are stored on at least one computer readable medium.

In some exemplary embodiments, the analysis and/or data collection may utilize cloud computing paradigms, wherein shared resources, software and/or information are provided remotely to computers and other devices on-demand. Cloud computing may entail use of the Internet and/or remote servers to maintain data and software applications.

Numerous applications exist for exemplary systems and methods that enable an entity (e.g., companies, healthcare professionals, individuals, marketers, demographers, job seekers, job suppliers) to analyze data (e.g. information on a person) associated with a person, who is represented as a node in the network, without sacrificing user privacy. When implementing exemplary embodiments of the invention, due regard and consideration should be paid to all pertinent legal and ethical standards pertaining to the use of data from social networks and the like. In some exemplary embodiments, if additional privacy is desired an "opt-in" system may be used in which users provide their explicit consent for each and every use of information that relates to them. In such exemplary embodiments, it may be necessary to receive an "opt-in" assent before storing attributes in memory.

One exemplary application where analysis of real-life social networks is advantageous is with respect to healthcare. Recent research involving social networks indicates that a person's health habits not only affect his or her own health but have a direct and measurable impact on members of his or her social network. Moreover, this effect has been found to extend to the social network of members of the immediate social network. For example, recent studies have shown that social networks can have a much bigger impact on health behaviors than previously suspected. As one example, an individual's decision to stop smoking is strongly affected by whether people in his or her social network quit—even by people they don't personally know. In fact, entire social networks of smokers appear to quit almost simultaneously, according to researchers, medical sociologist Nicholas Christakis of Harvard Medical School and political scientist James Fowler of the University of California at San Diego. As another example, obesity can follow a pattern within social groups, appearing in one person and 'spreading' to another in a "viral" fashion. For a more detailed discussion of these research studies, see, Thompson C., "Are Your Friends Making You Fat?", The New York Times Magazine, Sep. 10, 2009.

In addition, researchers have used one of the most popular social networks, Facebook®, for various social network studies. Facebook® is a social networking website that is operated and privately owned by Facebook, Inc. As an example, researchers curious about the spread of "happiness" looked at users who smile in their profile pictures. The researchers found that "smiling profiles cluster in much the same way as happiness clusters in the Framingham Heart Study." For a more detailed discussion of this study, see, Landau E., "Happiness is Contagious in Social Networks", available online from CNN.com, Dec. 5, 2008.

Furthermore, researchers have shown that even people a person never meets, such as friends of a friend, for example, can influence that person (e.g., "make" that person quit smoking, eat too much, become happier). This phenomenon might be explained by the tendency of individuals to associate and bond with other individuals who are like them. This happens both in "real life" and in purely electronic social networks. Physical closeness does not appear to be a key factor. For example, with respect to obesity, spouses do not appear to have as great an effect on one another as friends do. Some researchers believe that a behavior can skip links. For instance, a behavior might spread to a friend of a friend without affecting the person who connects them. In one or more exemplary embodiments, at least one of the data nodes is connected to the subject node through a path containing two or more data nodes and two or more connections (e.g., vie one or more other nodes in the social network).

The term "entity" (e.g., as used in relation to a network or social network) may correspond to one or more people, groups of people or arrangements of people. In some exemplary embodiments of the invention, an entity comprises at least one business, at least one product, at least one service, at least one avatar (e.g., a representation of a person, business or other entity in a virtual world or virtual environment), and/or at least one person, as non-limiting examples. In those exemplary instances where the entity comprises at least one person, one or more attributes associated with that entity may include at least one of the following: professional information (e.g., information relating to the person's career, training and/or work experience), skill information, health information, preference information and personal information (e.g., address, age, friends, social network, family).

As an example, note that if an analysis determines that a user has a significant number of book authors, engineers, or copyeditors in a portion of the user's social network, a reporting module may generate a report regarding this finding. In some exemplary embodiments, this report is sent to the user or an entity specified by the user. This may be done in a secure manner, as outlined with respect to the exemplary embodiments of the invention, for example. This may be useful for a user assessing the kinds of connections and potential influencers of the user's behavior. It also may provide the user with information that the user can use to obtain assistance, such as assistance in editing a book or finding a job, for example.

Figure 1:
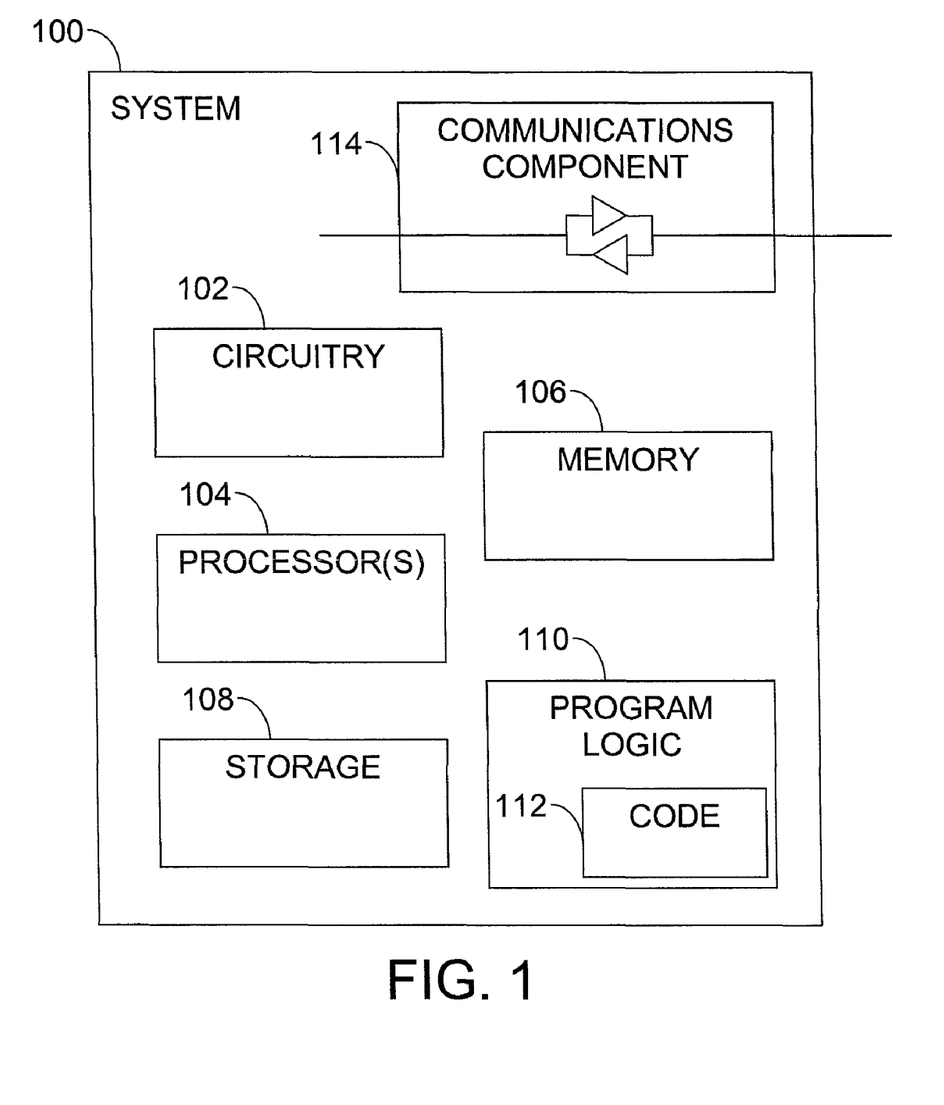
FIG. 1 illustrates a block diagram of an exemplary system in which various exemplary embodiments of the invention may be implemented.

FIG. 1 illustrates a block diagram of an exemplary system in which various exemplary embodiments of the invention may be implemented. The system 100 may include at least one circuitry 102 (e.g., circuitry element, circuitry components, integrated circuit) that may in certain exemplary embodiments include at least one processor 104. The system 100 may also include at least one memory 106 (e.g., a volatile memory device, a non-volatile memory device), and/or at least one storage 108. The storage 108 may include a non-volatile memory device (e.g., EEPROM, ROM, PROM, RAM, DRAM, SRAM, flash, firmware, programmable logic, etc.), magnetic disk drive, optical disk drive and/or tape drive, as non-limiting examples. The storage 108 may comprise an internal storage device, an attached storage device and/or a network accessible storage device, as non-limiting examples. The system 100 may include at least one program logic 110 including code 112 (e.g., program code) that may be loaded into the memory 106 and executed by the processor 104 and/or circuitry 102. In certain exemplary embodiments, the program logic 110, including code 112, may be stored in the storage 108. In certain other exemplary embodiments, the program logic 110 may be implemented in the circuitry 102. Therefore, while FIG. 1 shows the program logic 110 separately from the other elements, the program logic 110 may be implemented in the memory 106 and/or the circuitry 102, as non-limiting examples.

The system 100 may include at least one communications component 114 that enables communication with at least one other component, system, device and/or apparatus. As non-limiting examples, the communications component 114 may include a transceiver configured to send and receive information, a transmitter configured to send information and/or a receiver configured to receive information. As a non-limiting example, the communications component 114 may comprise a modem or network card. The system 100 of FIG. 1 may be embodied in a computer or computer system, such as a desktop computer, a portable computer or a server, as non-limiting examples. The components of the system 100 shown in FIG. 1 may be connected or coupled together using one or more internal buses, connections, wires and/or (printed) circuit boards, as non-limiting examples.

It should be noted that in accordance with the exemplary embodiments of the invention, one or more of the circuitry 102, processor(s) 104, memory 106, storage 108, program logic 110 and/or communications component 114 may store one or more of the various items (e.g., data, databases, tables, items, vectors, matrices, variables, equations, formula, operations, operational logic, logic) discussed herein. As a non-limiting example, one or more of the above-identified components may receive and/or store the information and/or the transformed information. As a further non-limiting example, one or more of the above-identified components may receive and/or store the function(s), operations, functional components and/or operational components, as described herein.

The exemplary embodiments of this invention may be carried out by computer software implemented by the processor 104 or by hardware, or by a combination of hardware and software. As a non-limiting example, the exemplary embodiments of this invention may be implemented by one or more integrated circuits. The memory 106 may be of any type appropriate to the technical environment and may be implemented using any appropriate data storage technology, such as optical memory devices, magnetic memory devices, semiconductor-based memory devices, fixed memory and removable memory, as non-limiting examples. The processor 104 may be of any type appropriate to the technical environment, and may encompass one or more of microprocessors, general purpose computers, special purpose computers and processors based on a multi-core architecture, as non-limiting examples.

For illustration purposes, provided below is one, non-limiting example for utilizing an exemplary embodiment of the invention. This exemplary implementation is described with reference to FIGS. 2-4. Note that the references below to "data," a "table" (e.g., table H) or a "matrix" (e.g., matrix H) are used interchangeably under the assumption that the data in question similarly can be represented in table form or matrix form without any substantial changes or loss of information.

Consider a primary network $N_p$ having a plurality of primary nodes with each primary node having at least one primary property. Let this primary network be a social network consisting of a number of entities (e.g., people) connected based on one or more of the primary properties (e.g., friends with each other). The data for these primary nodes and associated primary properties can be represented in any suitable form such as a matrix, table or database, as non-limiting examples.

Figure 2:
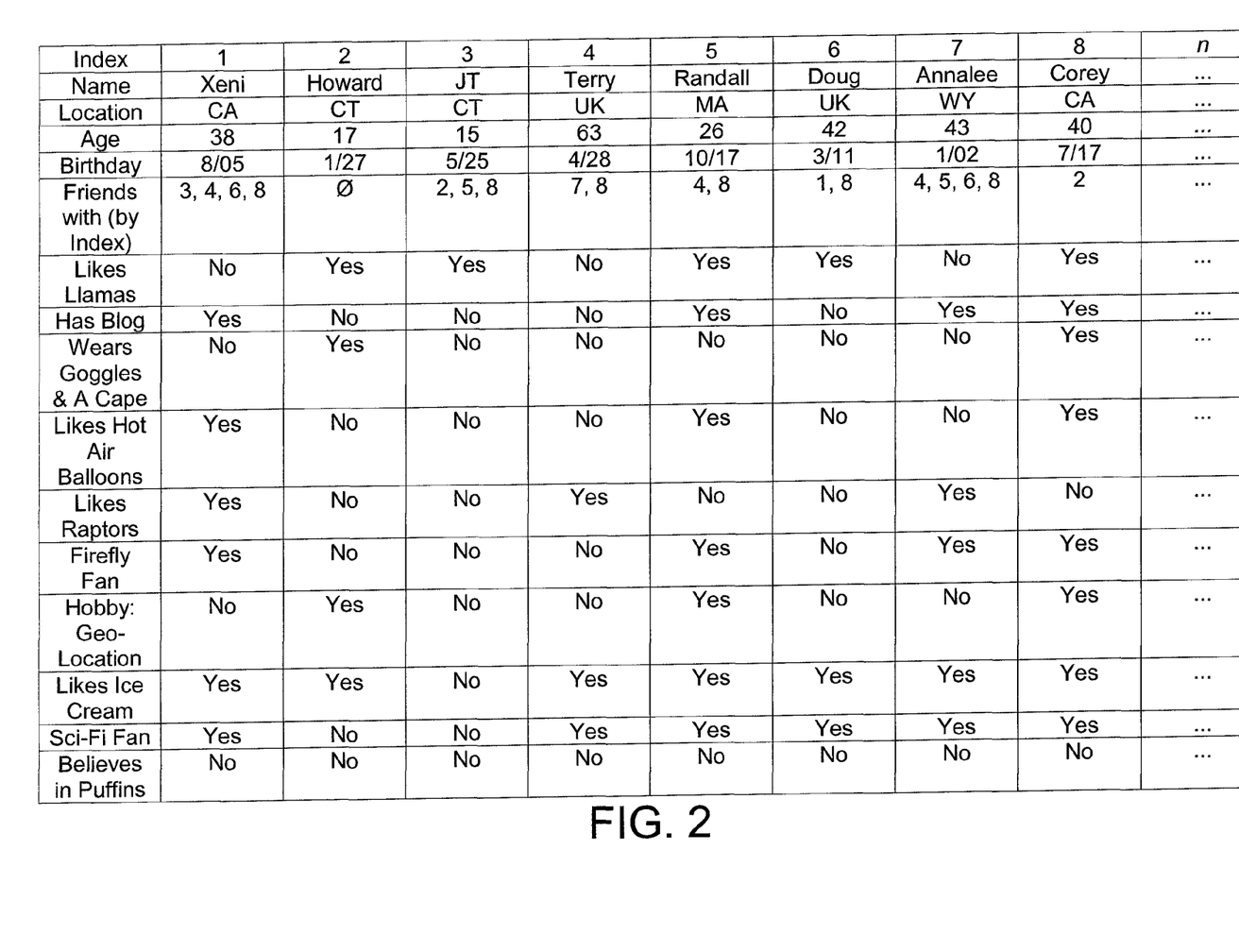
FIG. 2 shows a table with data for an example social network.
Figure 3:
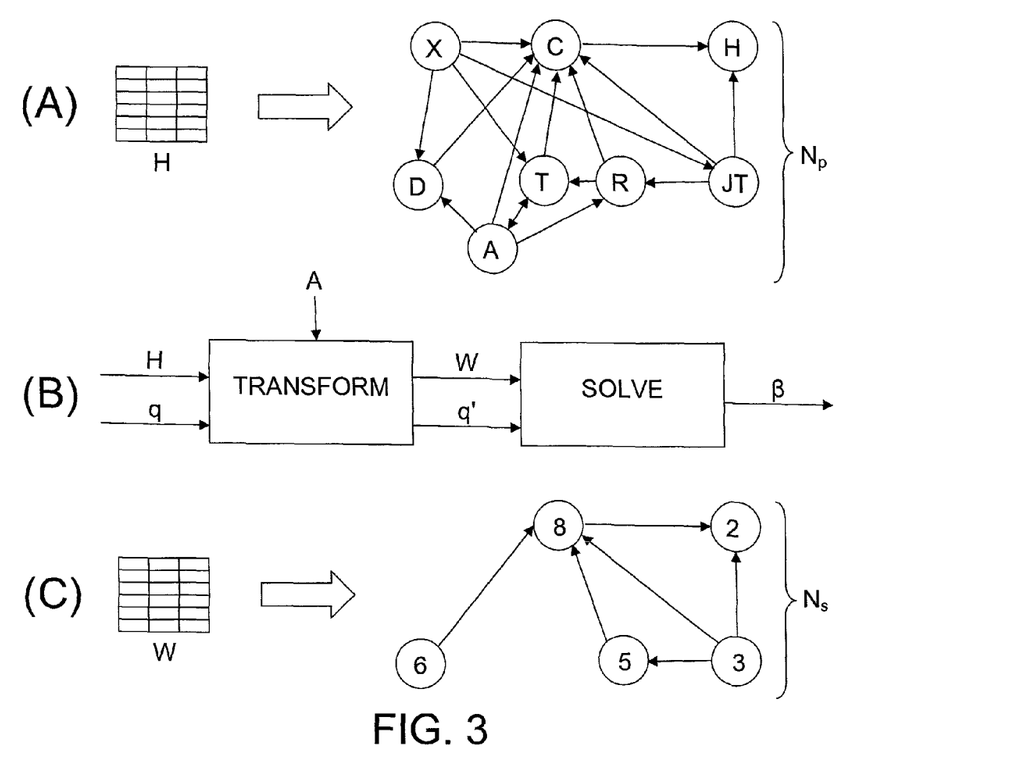
FIG. 3A shows how the data in the table of FIG. 2 is representative of a primary network.
FIG. 3B depicts transformation and solution operations for the table of FIG. 2.
FIG. 3C shows how the transformed data in the table of FIG. 4 can be used to generate a surrogate network.

FIG. 2 shows a table H with data for an example social network. As can be seen, a number of primary properties are represented, including ones that contain identification data (e.g., name, location, age) and/or data that may be used to identify the entity in question (e.g., birthday, friends with). FIG. 3A shows how the data in the table H of FIG. 2 is representative of the primary network $N_p$ with the connections between the primary nodes being based on the "friends with" data (assuming these relations to be directional).

For this example, assume that an advertiser would like to purchase targeted advertising for the social network $N_p$. Furthermore, for purposes of illustration assume that this advertiser is a purveyor of fine llamas seeking to expand their market. The advertiser contracts with the network operator and, desiring to protect the users' privacy, the network operator agrees to disclose some of the relevant information to the advertiser. In view of this, the query on the data will be for those users who like llamas. To enable further analysis of the potential market, the advertiser also requests that corresponding data for age, connections (friends with) and ice cream preference be provided.

In view of the query, the network operator uses a private key A to transform the data in the table H so that the results, table W, can be provided to the advertiser. FIG. 3B depicts the transformation and solution operations. More specifically, using the private key A, both the matrix H and the query q are transformed (e.g., by the network operator) to obtain transformed data in the form of table W and a transformed query q', respectively. These results, W and q', are used (e.g., by the network operator, by the advertiser, by a third-party) to obtain a representation β (e.g., a sparse representation), as described above. Note that the private key A is not shared with the advertiser or third-party. Furthermore, the private key A is non-determinable from the results of the transformation, W and q'. In addition, the transformation is non-invertible without the private key A.

Figure 4:
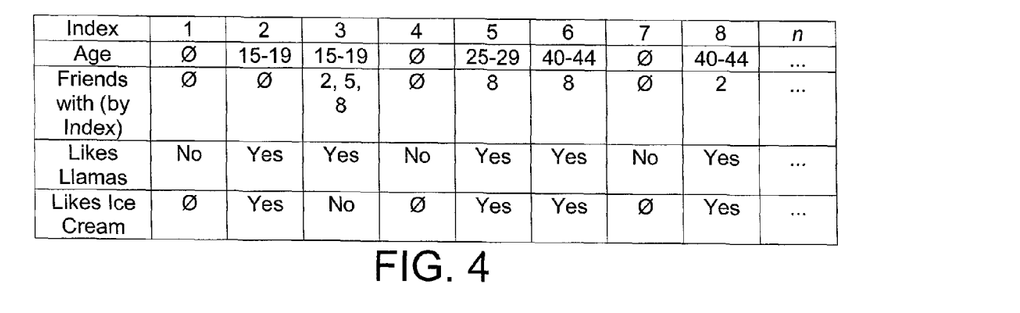
FIG. 4 shows a table illustrating the transformed data for the example social network.

FIG. 4 shows a table W illustrating the transformed data for the example social network. In this example, the transformation performed a number of operations, including: removing (e.g., masking, deleting, replacing) other data for those entities who indicated "No" for Likes Llamas; removing data for all properties other than the ones of interest (age, friends with, likes llamas, likes ice cream); removing (e.g., masking, deleting, replacing) friends with data for those entities who indicated "No" for Likes Llamas; and generalizing of age data into separate categories or ranges (e.g., data for an age of "26" is changed to "25-29"). As may be appreciated, the resulting transformed data W does not enable the identification of the corresponding entity (e.g., there is insufficient data to enable identification of the entity). Furthermore, correspondence is maintained back to the original data H such that the network operator can determine the identity of the entity and contact or otherwise target this entity (e.g., for targeted advertisement).

FIG. 3C shows how the transformed data W can be used to generate a surrogate network $N_s$. The surrogate network $N_s$ may be used to represent the transformed data W and/or enable further analyses of the transformed data W, as non-limiting examples. The advertiser can use the transformed data W and/or the surrogate network $N_s$ for targeted advertising, as a non-limiting example.

With respect to the transformed query q', in one interpretation the original query q further can be seen implicitly to include the elements "and we do not need data for the other primary properties." In such a view, the transformed query q' may be seen to have operations performed on it similar to those performed on the original data H to obtain the transformed data W. For example, the transformed query q' may include "queries" on the non-desired primary properties that are null (Ø), noise or are otherwise masked or deleted. Applying the same transformation (based on the same private key A) to the original query q as well as the original data H ensures that the solution, representation β, remains the same for both the original items H and q and the transformed items W and q'.

One of ordinary skill in the art will appreciate the various options available for the transformation. Furthermore, one of ordinary skill in the art will appreciate the various operations and/or analyses that may be performed using the transformed data and/or surrogate network.

Another exemplary embodiment is described immediately below. It should be noted that the correspondence (e.g., notation, identified items, parentheticals) is merely exemplary and non-limiting. In this exemplary embodiment, raw information (data) is stored (in a matrix or table H) for at least one primary property (properties, aspects, elements, descriptives) of at least one primary node within a primary network (a social network, $N_p$). The primary network ($N_p$) is comprised of an interconnected plurality of primary nodes (a node for each entity/person in the social network), where connections among the plurality of primary nodes within the primary network ($N_p$) are based on at least one of the at least one primary property and one or more types of relationships and interdependencies between the primary nodes (friend relationships among the entities/people). In response to receiving a query (q) on the stored raw information (H), the stored raw information (H) is transformed into transformed information (a matrix or table W) using at least one key (private key A) and based on the received query (q). The received query (q) is in relation to at least one queried property (target data, target properties, target information) of the at least one primary property. The transformed information (W) comprises transformed data (data/entries of W) for the at least one queried property of the at least one primary node. The transformed information (W) is representative of a surrogate network ($N_s$) comprising a plurality of surrogate nodes that correspond to at least a portion of the plurality of primary nodes from the primary network (surrogate network may include a subset or an entirety of the primary nodes). The transformed information (W) does not correspond to an entirety of the stored raw information (identification information is masked or removed). The transformed information (W) is configured to enable performance of at least one operation on the transformed information (W) without specific knowledge of and without revealing the entirety of the stored raw information (can perform analyses on W without being able to identify the entities/people). The transformed information (W) is further configured to enable one in possession of the at least one key (A) to relate an output of the at least one operation to the stored raw information (the possessor of A can identify the entities in question). A solution (β) is generated that relates a transformed query (q') to the transformed information (W). The transformed query (q') comprises a transformed representation of the received query (q) obtained by using the at least one key (A).

Below are further descriptions of various non-limiting, exemplary embodiments of the invention. The below-described exemplary embodiments are numbered separately for clarity purposes. This numbering should not be construed as entirely separating the various exemplary embodiments since aspects of one or more exemplary embodiments may be practiced in conjunction with one or more other aspects or exemplary embodiments.

Figure 5:
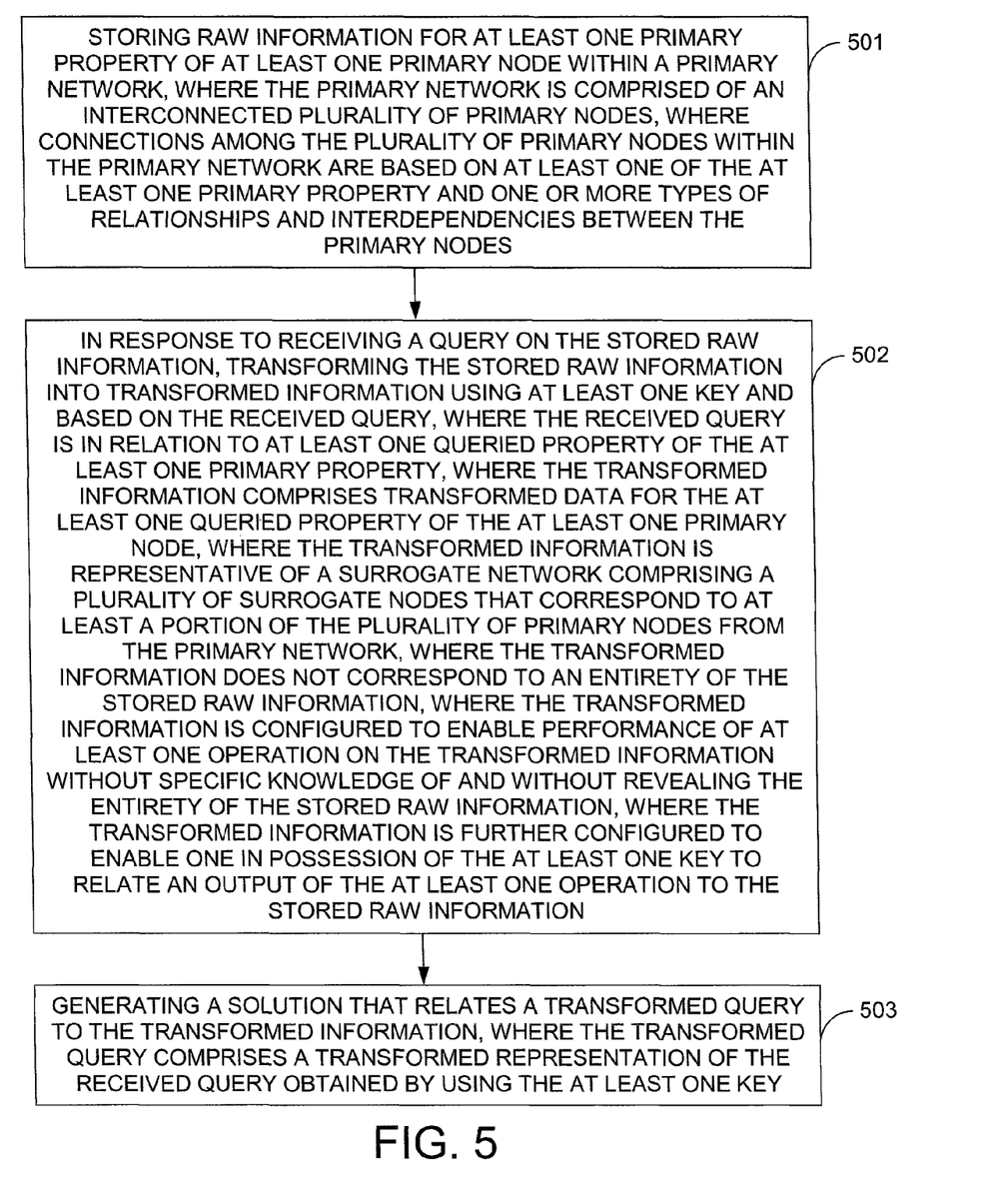
FIG. 5 depicts a flowchart illustrating one non-limiting example of a method, and execution of a computer program, for practicing the exemplary embodiments of this invention.

(1) In another exemplary embodiment of the invention, and as shown in FIG. 5, a computer readable storage medium tangibly embodying a program of instructions executable by a machine for performing operations comprising: storing raw information for at least one primary property of at least one primary node within a primary network, where the primary network is comprised of an interconnected plurality of primary nodes, where connections among the plurality of primary nodes within the primary network are based on at least one of the at least one primary property and one or more types of relationships and interdependencies between the primary nodes (501); in response to receiving a query on the stored raw information, transforming the stored raw information into transformed information using at least one key and based on the received query, where the received query is in relation to at least one queried property of the at least one primary property, where the transformed information comprises transformed data for the at least one queried property of the at least one primary node, where the transformed information is representative of a surrogate network comprising a plurality of surrogate nodes that correspond to at least a portion of the plurality of primary nodes from the primary network, where the transformed information does not correspond to an entirety of the stored raw information, where the transformed information is configured to enable performance of at least one operation on the transformed information without specific knowledge of and without revealing the entirety of the stored raw information, where the transformed information is further configured to enable one in possession of the at least one key to relate an output of the at least one operation to the stored raw information (502); and generating a solution that relates a transformed query to the transformed information, where the transformed query comprises a transformed representation of the received query obtained by using the at least one key (503).

A computer readable storage medium as in any above, where the solution comprises a sparse representation. A computer readable storage medium as in any above, where the network comprises a social network or an online social network. A computer readable storage medium as in any above, where the at least one operation is performed by a third party who does not have access to the at least one private key. A computer readable storage medium as in any above, where the at least one operation is performed by an untrusted third party who does not have access to the at least one private key. A computer readable storage medium as in any above, where the surrogate network uses at least one different basis than the primary network for connections between the surrogate nodes. A computer readable storage medium as in any above, where each primary node corresponds to an entity of a plurality of entities. A computer readable storage medium as in any above, where each primary node corresponds to a different entity of a plurality of entities. A computer readable storage medium as in any above, where each entity of the plurality of entities comprises one of: one or more persons, one or more organizations, one or more companies, one or more healthcare professionals, one or more marketers, one or more demographers, one or more job seekers, or one or more job suppliers.

A computer readable storage medium as in any above, where the raw information and at least one key are stored by a network operator overseeing the primary network. A computer readable storage medium as in any above, where only the network operator has access to the at least one key. A computer readable storage medium as in any above, where the transformed information is further configured to enable performance of the at least one operation on the transformed information without access to the entirety of the stored raw information. A computer readable storage medium as in any above, where the transformation operates to remove, replace or mask others of the at least one primary property that are not relevant to the at least one queried property. A computer readable storage medium as in any above, the operations further comprising: providing (e.g., transmitting, sending) the solution to a provider of the query.

A computer readable storage medium as in any above, where the computer readable storage medium comprises a at least one memory or at least one program storage device. A computer readable storage medium as in any above, where the machine comprises a computer or at least one processor configured to execute the program of instructions. A computer readable storage medium as in any above, further comprising one or more aspects of the exemplary embodiments of the invention as described further herein.

(2) In one exemplary embodiment of the invention, and as shown in FIG. 5, a method comprising: storing (e.g., on at least one memory, on at least one storage device, on at least one computer-readable storage medium) raw information for at least one primary property of at least one primary node within a primary network, where the primary network is comprised of an interconnected plurality of primary nodes, where connections among the plurality of primary nodes within the primary network are based on at least one of the at least one primary property and one or more types of relationships and interdependencies between the primary nodes (501); in response to receiving a query on the stored raw information, transforming (e.g., by a first apparatus, by at least one processor, by at least one integrated circuit) the stored raw information into transformed information using at least one key and based on the received query, where the received query is in relation to at least one queried property of the at least one primary property, where the transformed information comprises transformed data for the at least one queried property of the at least one primary node, where the transformed information is representative of a surrogate network comprising a plurality of surrogate nodes that correspond to at least a portion of the plurality of primary nodes from the primary network, where the transformed information does not correspond to an entirety of the stored raw information, where the transformed information is configured to enable performance of at least one operation on the transformed information without specific knowledge of and without revealing the entirety of the stored raw information, where the transformed information is further configured to enable one in possession of the at least one key to relate an output of the at least one operation to the stored raw information (502); and generating (e.g., by a second apparatus, by the at least one processor, by the at least one integrated circuit) a solution that relates a transformed query to the transformed information, where the transformed query comprises a transformed representation of the received query obtained by using the at least one key (503).

A method as in any above, where the first apparatus comprises the second apparatus. A method as in any above, implemented as a computer program. A method as in any above, implemented as a program of instructions stored (e.g., tangibly embodied) on a program storage device (e.g., at least one memory, at least one computer-readable medium) and executable by a computer (e.g., at least one processor). A method as in any above, further comprising one or more aspects of the exemplary embodiments of the invention as described further herein.

(3) In a further exemplary embodiment of the invention, an apparatus comprising: at least one memory configured to store raw information for at least one primary property of at least one primary node within a primary network, where the primary network is comprised of an interconnected plurality of primary nodes, where connections among the plurality of primary nodes within the primary network are based on at least one of the at least one primary property and one or more types of relationships and interdependencies between the primary nodes; and at least one processor configured, in response to receiving a query on the stored raw information, to transform the stored raw information into transformed information using at least one key and based on the received query, where the received query is in relation to at least one queried property of the at least one primary property, where the transformed information comprises transformed data for the at least one queried property of the at least one primary node, where the transformed information is representative of a surrogate network comprising a plurality of surrogate nodes that correspond to at least a portion of the plurality of primary nodes from the primary network, where the transformed information does not correspond to an entirety of the stored raw information, where the transformed information is configured to enable performance of at least one operation on the transformed information without specific knowledge of and without revealing the entirety of the stored raw information, where the transformed information is further configured to enable one in possession of the at least one key to relate an output of the at least one operation to the stored raw information, where the at least one processor is further configured to generate a solution that relates a transformed query to the transformed information, where the transformed query comprises a transformed representation of the received query obtained by using the at least one key.

An apparatus as in any above, further comprising one or more aspects of the exemplary embodiments of the invention as described herein.

(4) In another exemplary embodiment of the invention, an apparatus comprising: means for storing raw information for at least one primary property of at least one primary node within a primary network, where the primary network is comprised of an interconnected plurality of primary nodes, where connections among the plurality of primary nodes within the primary network are based on at least one of the at least one primary property and one or more types of relationships and interdependencies between the primary nodes; means, responsive to receiving a query on the stored raw information, for transforming the stored raw information into transformed information using at least one key and based on the received query, where the received query is in relation to at least one queried property of the at least one primary property, where the transformed information comprises transformed data for the at least one queried property of the at least one primary node, where the transformed information is representative of a surrogate network comprising a plurality of surrogate nodes that correspond to at least a portion of the plurality of primary nodes from the primary network, where the transformed information does not correspond to an entirety of the stored raw information, where the transformed information is configured to enable performance of at least one operation on the transformed information without specific knowledge of and without revealing the entirety of the stored raw information, where the transformed information is further configured to enable one in possession of the at least one key to relate an output of the at least one operation to the stored raw information; and means for generating a solution that relates a transformed query to the transformed information, where the transformed query comprises a transformed representation of the received query obtained by using the at least one key.

An apparatus as in any above, further comprising one or more aspects of the exemplary embodiments of the invention as described herein.

(5) In a further exemplary embodiment of the invention, an apparatus comprising: storage circuitry configured to store raw information for at least one primary property of at least one primary node within a primary network, where the primary network is comprised of an interconnected plurality of primary nodes, where connections among the plurality of primary nodes within the primary network are based on at least one of the at least one primary property and one or more types of relationships and interdependencies between the primary nodes; transformation circuitry configured, in response to receiving a query on the stored raw information, to transform the stored raw information into transformed information using at least one key and based on the received query, where the received query is in relation to at least one queried property of the at least one primary property, where the transformed information comprises transformed data for the at least one queried property of the at least one primary node, where the transformed information is representative of a surrogate network comprising a plurality of surrogate nodes that correspond to at least a portion of the plurality of primary nodes from the primary network, where the transformed information does not correspond to an entirety of the stored raw information, where the transformed information is configured to enable performance of at least one operation on the transformed information without specific knowledge of and without revealing the entirety of the stored raw information, where the transformed information is further configured to enable one in possession of the at least one key to relate an output of the at least one operation to the stored raw information; and solution circuitry configured to generate a solution that relates a transformed query to the transformed information, where the transformed query comprises a transformed representation of the received query obtained by using the at least one key.

An apparatus as in any above, embodied as one or more integrated circuits. An apparatus as in any above, further comprising one or more aspects of the exemplary embodiments of the invention as described herein.

The exemplary embodiments of the invention, as discussed herein and as particularly described with respect to exemplary methods, may be implemented in conjunction with a program storage device (e.g., at least one memory) readable by a machine, tangibly embodying a program of instructions (e.g., a program or computer program) executable by the machine for performing operations. The operations comprise steps of utilizing the exemplary embodiments or steps of the method.

The blocks shown in FIG. 5 further may be considered to correspond to one or more functions and/or operations that are performed by one or more components, circuits, chips, apparatus, processors, computer programs and/or function blocks. Any and/or all of the above may be implemented in any practicable solution or arrangement that enables operation in accordance with the exemplary embodiments of the invention as described herein.

In addition, the arrangement of the blocks depicted in FIG. 5 should be considered merely exemplary and non-limiting. It should be appreciated that the blocks shown in FIG. 5 may correspond to one or more functions and/or operations that may be performed in any order (e.g., any suitable, practicable and/or feasible order) and/or concurrently (e.g., as suitable, practicable and/or feasible) so as to implement one or more of the exemplary embodiments of the invention. In addition, one or more additional functions, operations and/or steps may be utilized in conjunction with those shown in FIG. 5 so as to implement one or more further exemplary embodiments of the invention.

That is, the exemplary embodiments of the invention shown in FIG. 5 may be utilized, implemented or practiced in conjunction with one or more further aspects in any combination (e.g., any combination that is suitable, practicable and/or feasible) and are not limited only to the steps, blocks, operations and/or functions shown in FIG. 5.

As utilized herein, a "query" is considered to be an interrogatory on a data set. The interrogatory may take any suitable form including, but not limited to: retrieval, sorting, searching, forming subsets, and performing one or more operations on the data. As an example, the query may be directed so as to return a subset of the data that matches one or more conditions or properties. As another example, the query may be directed to return the results of performing one or more operations on the data set. The form of the results from the query may comprise any suitable form (e.g., vector, matrix, table, database) for one or more of the following, as non-limiting examples: storage of the results, further operations on the results and/or displaying of the results.

As utilized herein, a "surrogate network" is considered to be a secondary network or a secondary representation of a network that is at least partially related to a primary network or a primary representation of the network (e.g., a prime network, a primary network). As an example, the surrogate network may preserve some properties of the primary network while discarding, masking or anonymizing other properties of the primary network. As another example, the surrogate network may comprise a subset or portion of the primary network. In some cases, the surrogate network may comprise surrogate nodes that correspond (e.g., uniquely correspond, correspond on a one-to-one basis) to primary nodes in the primary network. The surrogate nodes may preserve some properties of the primary nodes while discarding, masking or anonymizing other properties of the primary nodes. Connections between the surrogate nodes within the surrogate network (e.g., "surrogate connections") may be based on at least one different basis (e.g., at least one different property, relationship and/or interdependency) than the connections between primary nodes within the primary network (e.g., "primary connections"). In some cases, the surrogate connections are based on one or more additional bases than the primary connections. In other cases, the surrogate connections are solely based on one or more different bases than the primary connections. In at least some cases, the surrogate network may be considered an alternate representation of the primary nodes from the primary network that preserves some information from the primary network such that the preserved information is less than all of the information from the primary network.

Any use of the terms "connected," "coupled" or variants thereof should be interpreted to indicate any such connection or coupling, direct or indirect, between the identified elements. As a non-limiting example, one or more intermediate elements may be present between the "coupled" elements. The connection or coupling between the identified elements may be, as non-limiting examples, physical, electrical, magnetic, logical or any suitable combination thereof in accordance with the described exemplary embodiments. As non-limiting examples, the connection or coupling may comprise one or more printed electrical connections, wires, cables, mediums or any suitable combination thereof.

As will be appreciated by one skilled in the art, exemplary embodiments of the present invention may be embodied as a system, method or computer program product. Accordingly, exemplary embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, exemplary embodiments of the present invention may take the form of a computer program product embodied in one or more program storage device(s) or computer readable medium(s) having computer readable program code embodied thereon.

Any combination of one or more program storage device(s) or computer readable medium(s) may be utilized. The computer readable medium may be a computer readable signal medium or a computer readable storage medium. As non-limiting examples, a computer readable storage medium may comprise one or more of: an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device (e.g., one or more processors).

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider (ISP)).

Exemplary embodiments of the present invention are described herein with reference to flowchart illustrations and/or block diagrams of methods, apparatus (systems) and computer program products according to exemplary embodiments of the invention. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via at least one processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other device to cause a series of operational steps to be performed on the computer, other programmable apparatus or other device to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality and operation of possible implementations of systems, methods and computer program products according to various exemplary embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and possibly combinations of blocks in the block diagrams and/or flowchart illustration, can be implemented by special purpose hardware-based systems that perform the specified functions or acts, or combinations of special purpose hardware and software (e.g., computer instructions).

Generally, various exemplary embodiments of the invention can be implemented in different mediums, such as software, hardware, logic, special purpose circuits or any combination thereof. As a non-limiting example, some aspects may be implemented in software which may be run on a computing device, while other aspects may be implemented in hardware.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications will still fall within the scope of the teachings of the exemplary embodiments of the invention.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A computer readable storage medium tangibly embodying a program of instructions executable by a machine for performing operations comprising:

storing raw information for at least one primary property of at least one primary node within a primary network, where the primary network is comprised of an interconnected plurality of primary nodes, where connections among the plurality of primary nodes within the primary network are based on at least one of the at least one primary property and one or more types of relationships and interdependencies between the primary nodes;

in response to receiving a query on the stored raw information, transforming the stored raw information into transformed information using at least one key and based on the received query, where the received query is in relation to at least one queried property of the at least one primary property, where the transformed information comprises transformed data for the at least one queried property of the at least one primary node, where the transformed information is representative of a surrogate network comprising a plurality of surrogate nodes that correspond to at least a portion of the plurality of primary nodes from the primary network, where the transformed information does not correspond to an entirety of the stored raw information, where the transformed information is configured to enable performance of at least one operation on the transformed information without specific knowledge of and without revealing the entirety of the stored raw information, where the transformed information is further configured to enable one in possession of the at least one key to relate an output of the at least one operation to the stored raw information; and generating a solution that relates a transformed query to the transformed information, where the transformed query comprises a transformed representation of the received query obtained by using the at least one key.

2. The computer readable storage medium as in claim 1, where the solution comprises a sparse representation.

3. The computer readable storage medium as in claim 1, where the network comprises a social network or an online social network.

4. The computer readable storage medium as in claim 1, where the at least one operation is performed by a third party who does not have access to the at least one key.

5. The computer readable storage medium as in claim 1, where the at least one operation is performed by an untrusted third party who does not have access to the at least one key.

6. The computer readable storage medium as in claim 1, where the surrogate network uses at least one different basis than the primary network for connections between the surrogate nodes.

7. The computer readable storage medium as in claim 1, where each primary node corresponds to an entity of a plurality of entities.

8. The computer readable storage medium as in claim 1, where each primary node corresponds to a different entity of a plurality of entities.

9. The computer readable storage medium as in claim 1, where each primary node corresponds to an entity of a plurality of entities and where each entity of the plurality of entities comprises one of: one or more persons, one or more organizations, one or more companies, one or more healthcare professionals, one or more marketers, one or more demographers, one or more job seekers, or one or more job suppliers.

10. The computer readable storage medium as in claim 1, where the raw information and at least one key are stored by a network operator overseeing the primary network.

11. The computer readable storage medium as in claim 1, where only the network operator has access to the at least one key.

12. The computer readable storage medium as in claim 1, where the transformed information is further configured to enable performance of the at least one operation on the transformed information without access to the entirety of the stored raw information.

13. The computer readable storage medium as in claim 1, where the transformation operates to remove, replace or mask others of the at least one primary property that are not relevant to the at least one queried property.

14. A method comprising:
storing raw information for at least one primary property of at least one primary node within a primary network, where the primary network is comprised of an interconnected plurality of primary nodes, where connections among the plurality of primary nodes within the primary network are based on at least one of the at least one primary property and one or more types of relationships and interdependencies between the primary nodes;
in response to receiving a query on the stored raw information, transforming the stored raw information into transformed information using at least one key and based on the received query, where the received query is in relation to at least one queried property of the at least one primary property, where the transformed information comprises transformed data for the at least one queried property of the at least one primary node, where the transformed information is representative of a surrogate network comprising a plurality of surrogate nodes that correspond to at least a portion of the plurality of primary nodes from the primary network, where the transformed information does not correspond to an entirety of the stored raw information, where the transformed information is configured to enable performance of at least one operation on the transformed information without specific knowledge of and without revealing the entirety of the stored raw information, where the transformed information is further configured to enable one in possession of the at least one key to relate an output of the at least one operation to the stored raw information; and
generating a solution that relates a transformed query to the transformed information, where the transformed query comprises a transformed representation of the received query obtained by using the at least one key.

15. The method as in claim 14, where the solution comprises a sparse representation.

16. The method as in claim 14, where the network comprises a social network or an online social network.

17. The method as in claim 14, where each primary node corresponds to an entity of a plurality of entities and where each entity of the plurality of entities comprises one of: one or more persons, one or more organizations, one or more companies, one or more healthcare professionals, one or more marketers, one or more demographers, one or more job seekers, or one or more job suppliers.

18. The method as in claim 14, where the transformation operates to remove, replace or mask others of the at least one primary property that are not relevant to the at least one queried property.

19. An apparatus comprising:
at least one memory configured to store raw information for at least one primary property of at least one primary node within a primary network, where the primary network is comprised of an interconnected plurality of primary nodes, where connections among the plurality of primary nodes within the primary network are based on at least one of the at least one primary property and one or more types of relationships and interdependencies between the primary nodes; and
at least one processor configured, in response to receiving a query on the stored raw information, to transform the stored raw information into transformed information using at least one key and based on the received query, where the received query is in relation to at least one queried property of the at least one primary property, where the transformed information comprises transformed data for the at least one queried property of the at least one primary node, where the transformed information is representative of a surrogate network comprising a plurality of surrogate nodes that correspond to at least a portion of the plurality of primary nodes from the primary network, where the transformed information does not correspond to an entirety of the stored raw information, where the transformed information is configured to enable performance of at least one operation on the transformed information without specific knowledge of and without revealing the entirety of the stored raw information, where the transformed information is further configured to enable one in possession of the at least one key to relate an output of the at least one operation to the stored raw information,
where the at least one processor is further configured to generate a solution that relates a transformed query to the transformed information, where the transformed query comprises a transformed representation of the received query obtained by using the at least one key.

20. The apparatus as in claim 19, where the solution comprises a sparse representation.

21. The apparatus as in claim 19, where the network comprises a social network or an online social network.

22. The apparatus as in claim 19, where each primary node corresponds to an entity of a plurality of entities and where each entity of the plurality of entities comprises one of: one or more persons, one or more organizations, one or more companies, one or more healthcare professionals, one or more marketers, one or more demographers, one or more job seekers, or one or more job suppliers.

23. An apparatus comprising:
means for storing raw information for at least one primary property of at least one primary node within a primary network, where the primary network is comprised of an interconnected plurality of primary nodes, where connections among the plurality of primary nodes within the primary network are based on at least one of the at least one primary property and one or more types of relationships and interdependencies between the primary nodes;

means, responsive to receiving a query on the stored raw information, for transforming the stored raw information into transformed information using at least one key and based on the received query, where the received query is in relation to at least one queried property of the at least one primary property, where the transformed information comprises transformed data for the at least one queried property of the at least one primary node, where the transformed information is representative of a surrogate network comprising a plurality of surrogate nodes that correspond to at least a portion of the plurality of primary nodes from the primary network, where the transformed information does not correspond to an entirety of the stored raw information, where the transformed information is configured to enable performance of at least one operation on the transformed information without specific knowledge of and without revealing the entirety of the stored raw information, where the transformed information is further configured to enable one in possession of the at least one key to relate an output of the at least one operation to the stored raw information; and means for generating a solution that relates a transformed query to the transformed information, where the transformed query comprises a transformed representation of the received query obtained by using the at least one key.

24. The apparatus as in claim 23, where the solution comprises a sparse representation.

25. The apparatus as in claim 23, where the means for storing comprises at least one memory or at least one computer-readable storage medium and where the means for transforming and the means for generating comprise at least one processor or at least one integrated circuit.

* * * * *